United States Patent [19]

Krauskopf

[11] Patent Number: 5,249,278
[45] Date of Patent: * Sep. 28, 1993

[54] MICROPROCESSOR BREAKPOINT APPARATUS

[75] Inventor: Joseph C. Krauskopf, Santa Clara, Calif.

[73] Assignee: Intel Corporation, Santa Clara, Calif.

[ * ] Notice: The portion of the term of this patent subsequent to Oct. 1, 2008 has been disclaimed.

[21] Appl. No.: 934,115

[22] Filed: Aug. 21, 1992

Related U.S. Application Data

[63] Continuation of Ser. No. 703,676, May 20, 1991, which is a continuation of Ser. No. 593,399, Oct. 31, 1990, Pat. No. 5,053,944, which is a continuation of Ser. No. 370,024, Jun. 22, 1989, abandoned, which is a continuation of Ser. No. 274,636, Nov. 15, 1988, Pat. No. 4,860,195, which is a continuation of Ser. No. 822,263, Jan. 24, 1986, abandoned.

[51] Int. Cl.$^5$ .................................................. G06F 9/42
[52] U.S. Cl. ........................................ 395/400; 364/200
[58] Field of Search ... 364/200 MS File, 900 MS File; 395/400

[56] References Cited

U.S. PATENT DOCUMENTS

| 3,937,938 | 2/1976 | Matthews | 364/200 |
| 4,041,471 | 8/1977 | Krossa et al. | 364/200 |
| 4,675,646 | 6/1987 | Lauer | 364/900 |

Primary Examiner—Dale M. Shaw
Assistant Examiner—Kee M. Tung
Attorney, Agent, or Firm—Blakely, Sokoloff, Taylor & Zafman

[57] ABSTRACT

A breakpoint apparatus incorporated in a single chip microprocessor. The apparatus permits breakpoints on specific references to either program instructions or data. The width of the breakpoint address can be varied, the apparatus includes a logic circuit for determining if the reference represented by the breakpoint address overlaps the current virtual address.

10 Claims, 3 Drawing Sheets

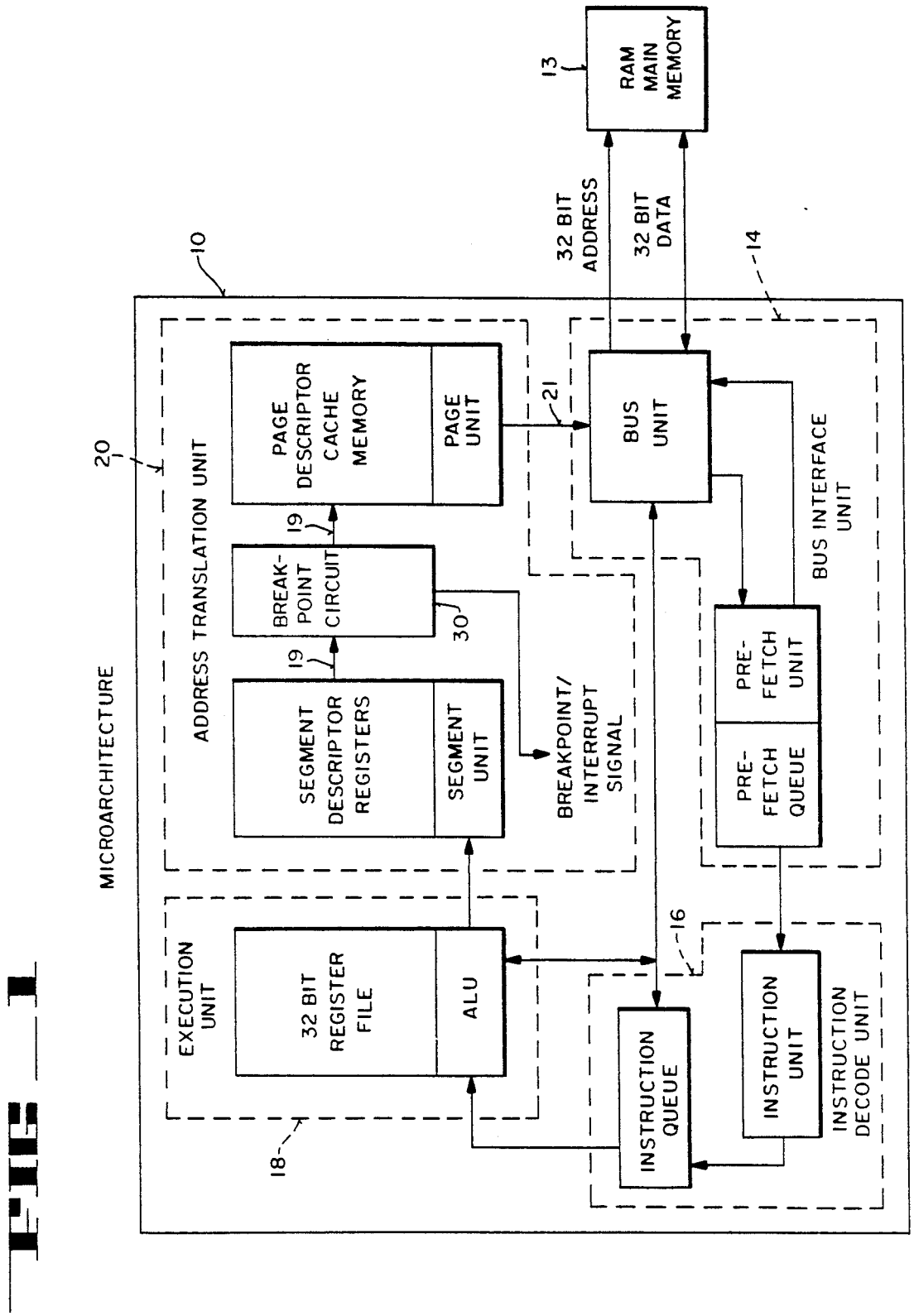
FIG__1

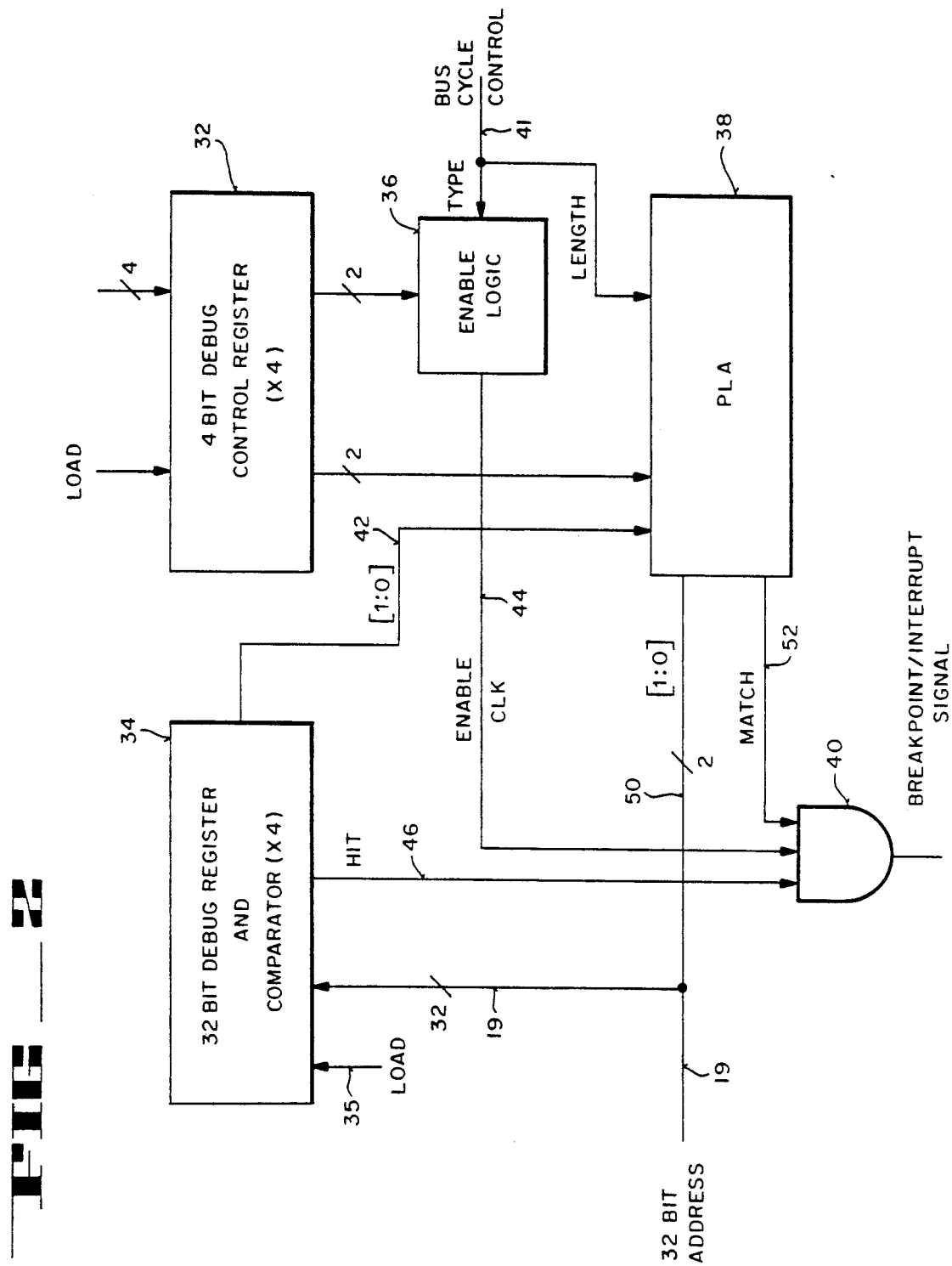

FIG_3
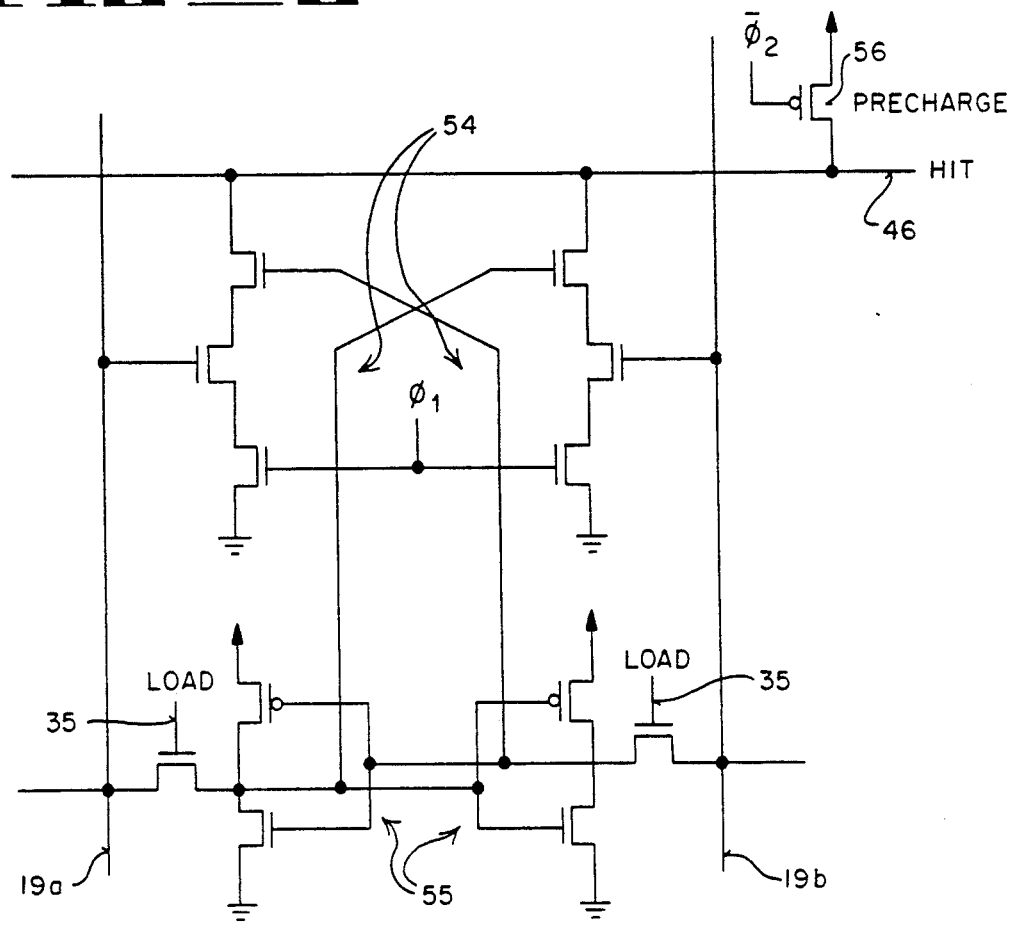
FIG_4A
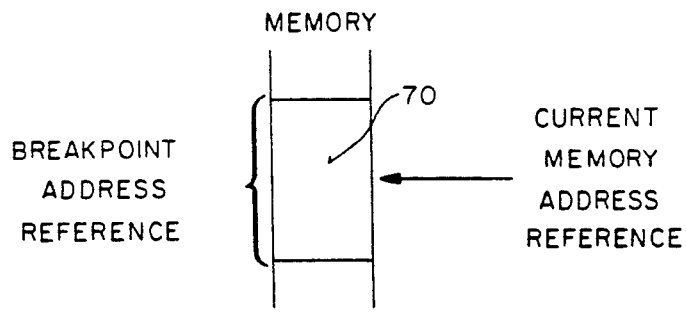
FIG_4B
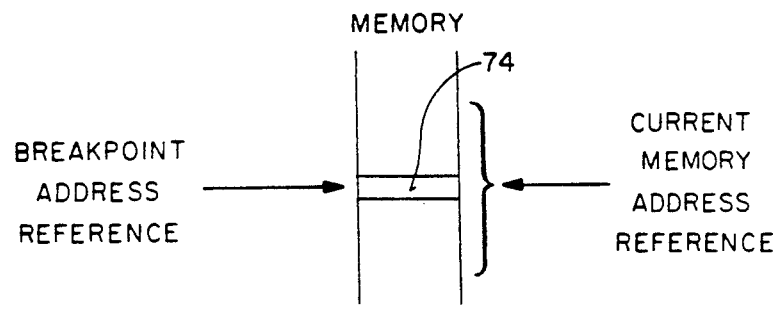

MICROPROCESSOR BREAKPOINT APPARATUS

This is a continuation of application Ser. No. 07/703,676, filed May 20, 1991, which is a continuation of application Ser. No. 07/593,399, filed Oct. 3, 1990, now U.S. Pat. No. 5,053,944, which is a continuation of application Ser. No. 07/370,024, filed Jun. 22, 1989, now abandoned, which is a continuation of application Ser. No. 07/274,636, filed Nov. 15, 1988, now U.S. Pat. No. 4,860,195, which is a continuation of application Ser. No. 06/822,263, filed Jan. 24, 1986, now abandoned.

BACKGROUND OF THE INVENTION

1. Field of the Invention

The invention relates to the field of hardware implemented breakpoints for computer programs, primarily used for analyzing or "debugging" programs.

2. Prior Art

Numerous techniques are used to analyze the performance of computer programs, particularly during their development. This is often referred to as "debugging". The debugging process is recognized as a significant part of the development of a computer program, and in some cases, the time required for debugging exceeds that required to write the program.

One technique used for debugging computer programs is to interrupt the program at predetermined events and then examine, for instance, the contents of registers. One such event is the generation of predetermined addresses which may be references to the computer program or data. When the address generated by the computer matches one of the predetermined addresses, a "breakpoint" occurs. The operation of the computer is interrupted to permit analysis.

One method of providing a breakpoint interrupt is to modify the computer program itself. At certain addresses in the program, the program provides an interrupt. This method is relatively inexpensive, however, it has the disadvantage that breakpoints cannot be set for address references to data.

In another method, hardware external to the computer or microprocessor is used for breakpoint interrupts. This hardware compares the computer generated addresses with the predetermined addresses and provides a breakpoint, or interrupt signal. This method is generally expensive and requires a significant amount of printed circuit board space. Moreover, for high speed processors it does not react quickly enough to provide a "real time" breakpoint. A significant problem arises where microprocessor includes an address translation unit such as a memory management unit on the microprocessor itself. The only computer generated addresses accessible to a user are the physical addresses typically communicated to a random-access memory. That is, virtual addresses used by the programmer may not be available. It is difficult to set breakpoints based on physical addresses.

As will be seen, the present invention provides a breakpoint apparatus which solves the above problems, and moreover, provides enhanced breakpoint selection.

SUMMARY OF THE INVENTION

The present invention provides a breakpoint signal apparatus useful in debugging computer programs. The apparatus is particularly useful in an integrated circuit microprocessor formed on a single substrate which includes address generation means for generating virtual addresses for reference to program instructions or data, a virtual address bus, address translation means for converting the virtual address on the bus to a physical address, interpretation means for interpreting the program instructions, and arithmetic means for operating upon the data in accordance with the interpreted instructions. The apparatus includes a first register for storing a predetermined address in the form of a virtual address at which a breakpoint is to occur. A second register is used for storing control bits which permit the user to select certain conditions of the breakpoint such as whether the breakpoint is to occur at a reference to computer program or data. a comparator means compares the predetermined virtual address with the address generated by the computer (current virtual address). A first logic means determines if the current virtual address is a reference to program instructions or data by examining address control signals. This logic means is also controlled by the control bits stored in the second register. Gating means used to provide the breakpoint signal and interrupt the operation of the computer is coupled to the output of the comparator means and the first logic means. The entire apparatus is formed on the same substrate with the microprocessor.

The apparatus also includes second logic means to determine if the current virtual address falls within the reference represented by the predetermined address or if the reference represented by the predetermined address falls within the reference made by the virtual address. In effect, this permits the width of the predetermined breakpoint address to be set by control bits stored in the second register.

BRIEF DESCRIPTION OF THE DRAWINGS

FIG. 1 is a block diagram illustrating the overall microarchitecture of a microprocessor in which the apparatus of the present invention is used.

FIG. 2 is a block diagram illustrating the breakpoint apparatus of the present invention.

FIG. 3 is an electrical schematic of one stage of one of the registers used in the block diagram of FIG. 2.

FIG. 4a is a diagram used to illustrate the case where the memory reference represented by the predetermined (breakpoint) address is wider than a memory address reference.

FIG. 4b is a diagram used to illustrate the case where the memory reference represented by the predetermined (breakpoint) address is narrower than a memory address reference.

DETAILED DESCRIPTION OF THE INVENTION

A breakpoint apparatus is described which is particularly suitable for use in a microprocessor where the microprocessor includes an address translation unit integrally fabricated with the microprocessor. Typically in such cases, the virtual addresses are not accessible to the user making it difficult to set breakpoints. In the currently preferred embodiment, the breakpoint apparatus is integrally formed on the same substrate with the microprocessor and its address translation unit.

In the following description, numerous specific details are set forth, such as specific number of bits, etc., in order to provide a thorough understanding of the present invention. It will be obvious, however, to one skilled in the art that the present invention may be practiced without these specific details. In other instances, well-known structures are not shown in detail in order not to unnecessarily obscure the present invention.

In its currently preferred embodiment, the microprocessor 10 of FIG. 1 is fabricated on a single silicon substrate using complementary metal-oxide-semiconductor (CMOS) processing. Any one of many well-known CMOS processes may be employed, however, it will be obvious that the present invention may be realized with other technologies, for instance, n-channel, bipolar, SOS, etc.

In FIG. 1, the single chip microprocessor 10 includes a bus interface unit 14, instruction decoder unit 16, execution unit 18, address translation unit 20, and the subject of the present invention, the breakpoint circuit 30 which is included within unit 20. The 32-bit microprocessor is shown coupled to an external random-access memory 13. The bus unit 14 includes buffers for transmitting the 32-bit address and for receiving and sending the 32 bits of data. Internal to the microprocessor, the bus unit includes a prefetch unit for fetching instructions from the memory 13 and a prefetch queue which communicates with the instruction unit of the instruction decoder. The queued instructions are interpreted and queued within unit 16. The arithmetic logic unit of the execution unit 18 in general executes the instructions.

For the illustrated microarchitecture, the address translation unit provides two address translation functions; one associated with the segment descriptor registers and the other with the page descriptor cache memory. It is linked to the bus interface (14). These functions are described in detail in copending application, Ser. No. 744,389, filed Jun. 13, 1985, entitled MEMORY MANAGEMENT FOR MICROPROCESSOR SYSTEM, and assigned to the assignee of the present invention. The breakpoint circuit is coupled between the segment descriptor registers and the page descriptor cache memory on the bus 19. The virtual addresses are transmitted over this bus. These virtual addresses are readily accessible to a programmer but the physical addresses are not. It is difficult to provide breakpoints based on physical addresses, as mentioned.

A control unit (not illustrated) is coupled to the units of FIG. 1 to provide overall control.

In FIG. 2, the breakpoint circuit 30 of FIG. 1 includes a 32-bit register and comparator 34. In the presently preferred embodiment, the register and a comparator are incorporated in a single circuit; one stage of this register/comparator is shown in FIG. 3. The register/comparator 34 stores the predetermined address at which breakpoints are to occur, hereinafter sometimes referred to as breakpoint addresses. The register/comparator 34 compares the stored breakpoint address with the virtual address generated by the microprocessor, hereinafter sometimes referred to as the current virtual address or current address. When the load signal 35 is present, a 32-bit breakpoint address is loaded over bus 19a into the register/comparator 34. Thereafter, the register/comparator 34 compares the breakpoint address with each current address on the bus 19 and when a match occurs, provides a "hit" signal on line 46. The two least significant bits of the breakpoint address in the register/comparator 34 are not used as part of this comparison for reasons which will be explained, but rather, are coupled to the programmable logic array (PLA) 38.

The instruction decode unit 16 of FIG. 1 interprets a predetermined instruction to the microprocessor as a load register/comparator 34 command and permits the user to thereby load register/comparator 34 with the breakpoint address. Another instruction allows the address stored in register/comparator 34 to be read by the user.

In the currently preferred embodiment, four register/comparators 34 are used allowing four different breakpoint addresses to be stored. For each register/comparator 34, there is an accompanying register 32, allowing for storage of control bits for each breakpoint address as will be explained. For purposes of explanation, the circuit of FIG. 2 is treated as having only a single first register/comparator 34 and a single second register 32. It will be obvious, however, to one skilled in the art that any number of register/comparators 32 and register 34 may be employed, thereby permitting interruption at any one of a plurality of breakpoint addresses.

The control register 32 stores four control bits for each breakpoint address. One bit determines whether the breakpoint address represents a reference to data or to the computer program. In the cases of a reference to data, two control bits are used to determine the width of the breakpoint. In the currently preferred embodiment, the breakpoint may be 1, 2 or 4 bytes wide. Again, for data breakpoints, another control bit is used to permit interruption at either read-cycles only or read or write cycles. As is the case with register/comparator 34, a predetermined instruction to the microprocessor 10 is interpreted by the unit 16 to allow the user to load register 32. This may be the same instruction used to load register/comparator 34.

The enable logic circuit 36 is coupled to receive bus control signals. These lines contain the control signals which determine whether a current address is a reference to program or data; and, in the case of data references, whether it is a read cycle only or read or write cycle. The enable logic circuit 36 compares these control signals with two of the control bits from register 32 and if the memory cycle matches that selected by the user, an enable clock is generated to the AND gate 40. Ordinary logic circuits are used for this purpose.

As mentioned, the breakpoint may be 1, 2 or 4 bytes wide and this user selected width is stored in register 32. The two bits required for this selection are coupled to the PLA 38. Additionally, as mentioned, the two least significant bits stored in register/comparator 34 are coupled to the PLA 38. Timing and control signals from lines 20 are also coupled to the PLA 38. The PLA is not user programmable but rather is permanently programmed at manufacture. The PLA implements the logic set forth in the subsequent paragraph. The use of a PLA is not critical to the present invention, that is, other logic circuits may be used in lieu of the PLA. The PLA provides a signal to gate 40 when a "match" occurs.

Referring to FIG. 4a, a relatively wide breakpoint address reference 70 is illustrated (e.g., 4 bytes). The current memory virtual address may reference only a portion of the reference 70. For the case of a narrow breakpoint address reference as shown in FIG. 4b, as reference 74, a relatively wide virtual address reference may encompass the narrower breakpoint address reference 74. The two cases shown in FIG. 4a and FIG. 4b are resolved by the PLA 38. As mentioned, ordinary logic circuits may be used to determine if the current memory address reference falls within a wide breakpoint address reference, or if a narrower breakpoint address reference falls within a wider current memory address reference. If either of these conditions occur, a "match" signal is provided on line 52.

The AND gate 40 receives three inputs, the hit signal from register/comparator 34, enable clock from logic circuit 36 and the match signal from circuit 38. The hit signal is generated when the 30 most significant bits of the current virtual address match the 30 most significant address bits of the stored breakpoint address. The output of gate 40 provides the breakpoint signal which is used to interrupt the operation of the microprocessor.

The illustrated single stage of register/comparator 34 shown in FIG. 3 includes a static memory cell 53 and a comparator 54. Bus lines 19a and 19b carry a single address bit and its complement. The hit line 46 is shown coupled to the comparator 54 and to a p-channel transistor 56. This transistor is used to precharge line 46 prior to each virtual address bus cycle. Line 46 is coupled to the other stages of the register/comparator 34.

The cross-coupled inverters form an ordinary flip-flop or static memory cell 55. This cell is loaded from lines 19a and 19b when the load signal is present on line 35. Once the register is loaded, the load signal drops in potential effectively decoupling the cell 55 from lines 19a and 19b. Thereafter, when the current virtual address appears on these lines and the ɸ1 signal is present, the contents of cell 55 are compared with the address on the bus 19 by the comparator 54. If any of the 32-bit pairs which are compared do not match, line 46 is discharged preventing the AND gate 40 of FIG. 2 from being enabled. The circuit of FIG. 3 is described in more detail in the above-mentioned application where the circuit is used as part of a content addressible memory.

In use, the user determines up to four breakpoint addresses, and selects whether the addresses are references to program or data, and in the case of data references the width of the reference and whether the breakpoint is to occur on a read cycle only or read or write cycle. Through a particular instruction, the user is then able to load up to four breakpoint addresses in register/comparator 34 and set the corresponding control bits for each breakpoint in register 32. Then during each virtual address bus cycle, a comparison occurs within the register/comparator 34 and the logic circuits 36 and 38 determine if the user selected conditions exist. If the addresses match and conditions match, then a breakpoint signal is generated at gate 40.

Unlike the prior art methods described, a real time breakpoint signal is generated. The comparisons occur while the virtual address is present on the bus, and since there is very little propagation delay, the interrupt signal can be generated at the appropriate time.

Thus, an improved breakpoint apparatus has been described. The apparatus is particularly useful for single chip microprocessors where virtual addresses are translated to physical addresses "on-chip".

I claim:

1. In an integrated circuit microprocessor which includes address generation circuitry for generating virtual addresses for reference to program instructions and data, address translation circuitry for converting said virtual addresses to physical addresses, an interpretation unit for interpreting program instructions, and an arithmetic unit for operating upon data in accordance with interpreted instructions, an improvement for providing a breakpoint signal comprising:

a first register for storing a virtual address, which determines where a breakpoint is to occur, said virtual address hereinafter referred to as a breakpoint address, said first register being loaded using a predetermined instruction interpreted by said interpretation unit;

a second register for storing control bits, which determine conditions when said breakpoint is to occur, said second register being loaded using a predetermined instruction interpreted by said interpretation unit; and breakpoint circuitry for generating said breakpoint signal, said breakpoint circuitry comparing at least a portion of said breakpoint address from said first register with at least a portion of a current virtual address, said breakpoint circuitry coupled to said second register to sense at least one of said stored control bits which determines if a breakpoint is to occur when said current virtual address is a reference to data or to program instructions, said breakpoint circuitry also coupled to receive bus control signals providing an identification of whether said current virtual address is a reference to data or to program instructions, said breakpoint circuitry generating said breakpoint signal when said current virtual address is an address where a breakpoint is to occur and when said at least one of said control bits matches said indentification;

said first and second registers and breakpoint circuitry providing a real time breakpoint signal to said microprocessor.

2. The improvement according to claim 1 wherein said second register stores control bits including an indication of a data width for said breakpoint address.

3. The improvement according to claim 1 wherein said second register stores control bits including an indication of whether a breakpoint is to occur on a reference to data during a read cycle only or a read or write cycle.

4. The improvement according to claim 1 in combination with a memory external to said microprocessor, said memory for storing instructions and data referenced by said physical address.

5. The improvement according to claim 1 including a plurality of registers for storing breakpoint addresses at which breakpoints are to occur, said first register being one of said plurality of registers.

6. In an integrated circuit microprocessor which includes address generation circuitry for generating virtual addresses for reference to program instructions and data, address translation circuitry for converting said virtual addresses to physical addresses, an interpretation unit for interpreting program instructions, and an arithmetic unit for operating upon data in accordance with interpreted instructions, a process for providing a real time breakpoint signal to said microprocessor, said process comprising the steps of:

providing a first register for storing a virtual address where a breakpoint is to occur, said virtual address hereinafter referred to as a breakpoint address, said first register being loaded using a predetermined instruction interpreted by said interpretation unit;

providing a second register for storing control bits defining conditions when a breakpoint is to occur, said control bits defining if a breakpoint is to occur when said breakpoint address is a reference to data or to program instructions, said second register being loaded using a predetermined instruction interpreted by said interpretation unit;

receiving a current virtual address;

receiving a bus control signal indicating whether said current virtual address is a reference to data or to program instructions;

comparing at least a portion of said breakpoint address from said first register with at least a portion of said current virtual address;

comparing at least a portion of said control bits from said second register with said bus control signal; and generating said breakpoint signal when,
   i) said at least a portion of said breakpoint address from said first register matches said at least a portion of said current virtual address, and
   ii) said at least a portion of said control bits from said second register matches said bus control signal.

7. The process according to claim 6 wherein said second register stores control bits including an indication of a data width for said breakpoint address.

8. The process according to claim 6 wherein said second register stores control bits including an indication of whether a breakpoint is to occur on a reference to data during a read cycle only or a read or write cycle.

9. The process according to claim 6 wherein instructions and data referenced by said physical address are stored in a memory external to said microprocessor.

10. The process according to claim 6 further including a step of providing a second register for storing a different breakpoint address at which a different breakpoint is to occur.

* * * * *